United States Patent
Wübbels et al.

(10) Patent No.: US 10,667,452 B2
(45) Date of Patent: Jun. 2, 2020

(54) SEMI-MOUNTED PLOUGH

(71) Applicant: Lemken GMBH & Co KG, Alpen (DE)

(72) Inventors: Benedikt Wübbels, Borken (DE); Sebastian Eïrmbter, Willich (DE); Stefan Mäsing, Borken (DE); Ernst Hönnekes, Weeze (DE); Andreas Schläwe, Korschenbroich (DE); Mark Verhülsdonk, Kevelaer (DE); Clemens Diepers, Aldekerk (DE)

(73) Assignee: LEMKEN GMBH & CO KG, Alpen (DE)

( * ) Notice: Subject to any disclaimer, the term of this patent is extended or adjusted under 35 U.S.C. 154(b) by 0 days.

(21) Appl. No.: 15/577,472

(22) PCT Filed: May 25, 2016

(86) PCT No.: PCT/DE2016/100240
§ 371 (c)(1),
(2) Date: Nov. 28, 2017

(87) PCT Pub. No.: WO2016/192712
PCT Pub. Date: Dec. 8, 2016

(65) Prior Publication Data
US 2018/0160610 A1 Jun. 14, 2018

(30) Foreign Application Priority Data

May 29, 2015 (DE) .......... 10 2015 108 505

(51) Int. Cl.
*A01B 3/46* (2006.01)

(52) U.S. Cl.
CPC .............. *A01B 3/466* (2013.01); *A01B 3/464* (2013.01)

(58) Field of Classification Search
CPC .......... A01B 3/462; A01B 3/464; A01B 3/466
USPC .................................................. 172/204, 225
See application file for complete search history.

(56) References Cited

U.S. PATENT DOCUMENTS

| 3,269,464 A | * | 8/1966 | Smelcer .............. A01B 63/1117 172/10 |
| 3,428,136 A | * | 2/1969 | Johannsen et al. .... A01B 3/464 172/225 |
| 3,511,317 A | * | 5/1970 | Richey ................... A01B 3/464 172/212 |
| 3,605,905 A | * | 9/1971 | Bo ....................... A01B 61/046 172/260.5 |

(Continued)

FOREIGN PATENT DOCUMENTS

| DE | 2436853 A1 | 2/1976 |
| DE | 2845111 A1 | 4/1980 |

(Continued)

*Primary Examiner* — Thomas B Will
*Assistant Examiner* — Joel F. Mitchell
(74) *Attorney, Agent, or Firm* — The Watson IP Group, PLC; Jovan N. Jovanovic

(57) ABSTRACT

A semi-mounted plough has a rear chassis, the plough trailing behind a plough-towing tractor in a laterally pivotable or steerable manner by a vertically oriented joint. In order to compensate lateral pulling for the tractor, which is generated by the traction force of the plough about the vertical axis of the tractor, an energy accumulator is arranged, which generates a torque counteracting the lateral pulling.

12 Claims, 4 Drawing Sheets

(56) References Cited

U.S. PATENT DOCUMENTS

| | | | | |
|---|---|---|---|---|
| 3,783,950 A | * | 1/1974 | Geurts | A01B 59/00 172/285 |
| 3,910,353 A | * | 10/1975 | Ralston | A01B 3/46 172/1 |
| 4,150,726 A | * | 4/1979 | Weitlow | B62D 13/04 172/711 |
| 4,503,916 A | * | 3/1985 | Wiegardt | A01B 63/1117 172/3 |
| 4,646,849 A | * | 3/1987 | Watvedt | A01B 3/42 172/225 |
| 2016/0192580 A1 | | 7/2016 | Wendte et al. | |

FOREIGN PATENT DOCUMENTS

| | | |
|---|---|---|
| DE | 3522921 A1 | 1/1987 |
| DE | 2845111 C2 | 2/1987 |
| DE | 202011101162 U1 | 10/2012 |
| DE | 102013008154 A1 | 11/2014 |
| EP | 561709 A1 | 9/1993 |
| EP | 2033503 A2 | 3/2009 |
| WO | 2004032601 A1 | 4/2004 |

\* cited by examiner

SEMI-MOUNTED PLOUGH

The invention relates to a semi-mounted plough according to the preamble of patent claim 1. In contrast to semi-mounted ploughs, mounted ploughs are supported and guided by the three-point hydraulic system of a tractor. The laterally pivotable lower links of the tractor pulling the mounted plough thereby form a four-bar linkage converging obliquely in the direction of travel towards the front, its instantaneous pole is in front of the rear axle of the tractor and forms the virtual traction point of the lower links. A recommendation with regard to the convergence dimensions mentions norm ISO 730. The forces acting during the ploughing on the individual plough body arranged obliquely to the rear can be combined in a common force application point, which is located in the longitudinal direction approximately in the center of the plough frame. The resulting traction force vector for the plough, which runs between this force application point and the virtual traction point of the lower links, is ideally centrally below the rear axle of the tractor and in the case of larger mounted ploughs from four plough bodies in the direction of the ploughed land. If the position of the traction force vector deviates from this ideal state, lateral pulling on the tractor arises and thus a deteriorated steering ability and an increased tractive power requirement. This requires an increased attention on the part of the tractor driver and increased fuel consumption. The German patent DE 2 845 111 C2 shows an adjusting device for producing this ideal state.

In contrast to mounted ploughs, which are completely supported by the lifting device of the tractor designed as a three-point hydraulic system, semi-mounted ploughs are generally provided with a chassis due to their large projection and their center of gravity distance to the tractor, wherein the plough in the form of a single axle trailer trails behind the tractor in a steerable manner and can be maneuvered. The articulated joint required for this is located on the plough usually approximately 1 to 1.5 m behind the rear axle center of the tractor and necessarily forms the pulling point, which defines the position of the traction force vector. Due to the prevailing tractive forces and the just described distance of the traction point to the rear axle of the tractor a jaw moment arises on the tractor, which steers the said tractor to the ploughed land. Even though the three-point hydraulic system of the tractor can be used for lifting the front part of the semi-mounted plough, the lower links of the tractor must be fixed laterally in order to ensure a maneuverability and defined controllability of the entire combination consisting of tractor and semi-mounted plough. On the basis of these requirements, a lateral correction of the traction point and thus of the lateral pulling on the tractor is not possible. The tractor driver must therefore steer against the furrow edge, which requires his increased attention and additional fuel consumption. With increasing body number and thus length as well as lateral projection of the plough the lateral pulling effect of the semi-mounted plough increases. The contact pressure also thereby decreases on the plough body, which ensures a smooth guidance of the plough body.

The problem addressed by the invention is to provide a semi-mounted plough, which despite the aforementioned kinematic boundary conditions avoids their disadvantages. This problem is solved by the features of the characterizing part of claim 1. The further claims show advantageous embodiments of the invention.

Through arrangement of an elastic energy accumulator at a lateral distance to a vertical articulation axis, which forms the articulated joint of the tractor-plough combination, a torque is generated about the articulation axis, which compensates the yaw moment, which acts on the tractor. Through a superelevation of this torque the tractor automatically conducts itself along the furrow edge, without a further steering intervention being required. Through the elasticity of the energy accumulator the adaptability of the combination is preserved even when cornering.

By using an adjustable spring accumulator the superelevation of the torque about the articulation axis can be flexibly adapted variably according to prevailing ground and tractive force conditions.

By using a fluid piston cylinder in hydraulic connection with an adjustable pressure source and at least one pressure accumulator element a high energy density can be provided in a small installation space. Since the pulling tractor is equipped as a rule with hydraulic control valves, it can be acted upon from the tractor seat easily and quickly by means of a control valve manipulating the torque ratios. The liquid pushed out during steering motions by the fluid cylinder is received in a preferably preloaded pressure accumulator and during the reverse motion of the fluid cylinder released again under pressure.

Also through the variable or movable arrangement at least of one of the points of articulation at a distance to the articulation axis, the spring force of the energy accumulator can be influenced. If, for example, the point of articulation between towing hitch and energy accumulator is designed as a sliding point of articulation, which slides over the curved path or unrolls by means of a bearing roller, any adjustment paths can be realized by means of the curved path contour via the pivot angle of the drawbar to the towing hitch. The lateral forces, which arise due to the sliding off of the energy accumulator on the curved path contour, cause a torque about the articulation axis with the lever distance of the sliding contact point to the articulation axis.

When using the invention in a rotary plough the plough frame pivots with its plough bodies into a right- or left-turning working position. Through the arrangement of the first point of articulation in the symmetry plane of the towing hitch, which runs vertically through the articulation axis of the towing hitch in the travel- or longitudinal direction, an equal distance of the first point of articulation to the articulation axis is achieved both in the right- as well as in the left-turning working position of the plough frame or the draw bar. During the turning process the energy accumulator passes through a dead center position when passing through the previously mentioned symmetry plane. Thus, in both working positions a constant pressure- or spring force of the energy accumulator can be delivered to the first point of articulation and thus a torque can be generated about the articulation axis, which acts on the towing hitch and thus on the combination guidance of the tractor and plough.

In a convenient embodiment of the invention the energy accumulator is activated by means of a switching-off device in the working position of the semi-mounted plough or is deactivated in the transport- or turning position of the semi-mounted plough. Thus, in the case of turning- or transport travel the combination is freed from the additional steering torques by the energy accumulator.

Through combination of the energy accumulator control with the activation of the semi-mounted chassis a further relief of the burden on the driver is achieved, in that through joint and at the same time alternating control of chassis lifting and energy accumulator loading only a single operating process of the driver is required. In the lifted state of the semi-mounted plough—in the case of transport- or turning travel—the energy accumulator is deactivated and in the lowered work position of the plough is activated. This is only made possible by an individual, double-acting control valve, which the tractor driver must activate during the turning process anyway for the plough lifting.

These and further functions can be further automated with a control- or regulating unit, which adjusts or manipulates the force delivered by the energy accumulator to the points of articulation, in that, for example, target values for the energy accumulator are preset or stored on the part of the tractor driver, which are started by the control- or regulating unit automatically or on request. The control- or regulating unit is thereby connected with a control valve on the semi-mounted plough or tractor.

By integration of measuring means such as force-, position- or pressure sensors, which determine the position of the plough frame or the drawbar relative to the towing hitch or the forces between plough frame and tractor, wherein the measuring means are connected with the control- or regulating unit, the latter can act in a controlling or regulating manner on the energy accumulator by means of the measuring data. In the process, measuring data of the towing tractor can also be sensed also via a cable- or wireless BUS system, just as the BUS system can be used to influence adjusting parameters of the tractor such as hydraulic valve positions, drive parameters and locking and adjustment means. At the same time, performance data or energy consumption of the tractor can also be retrieved, which are included in the regulating circuit for the energy accumulator loading and other adjusting parameters of the plough. Likewise, a record is made in a memory means for the display and geo-based charting by the control- and regulating unit. Thus, conclusions are drawn on the ground characteristics of the respectively ploughed areas.

The invention is characterized in particular in that through arrangement of an energy accumulator at a distance to the point of articulation of a combination consisting of a semi-mounted plough and a tractor, a corrective torque is applied about the point of articulation, which annuls or overrides the lateral pulling on the tractor, which arises as a result of the traction force requirement of the semi-mounted plough. Even though a lateral force acts on the contact plates through this corrective torque, which contact plates support the plough body sliding against the vertical furrow edge, and the frictional resistance is increased through the contact pressure, the slippage of the tractor reduced by less lateral pulling is predominant, so that in the overall view a lower drive energy requirement of the tractor is shown for pulling the semi-mounted plough according to the present invention.

Further details and advantages of the subject matter of the invention result from the following description and the associated drawings, in which an embodiment is depicted with the necessary details and individual parts.

Figure 1:
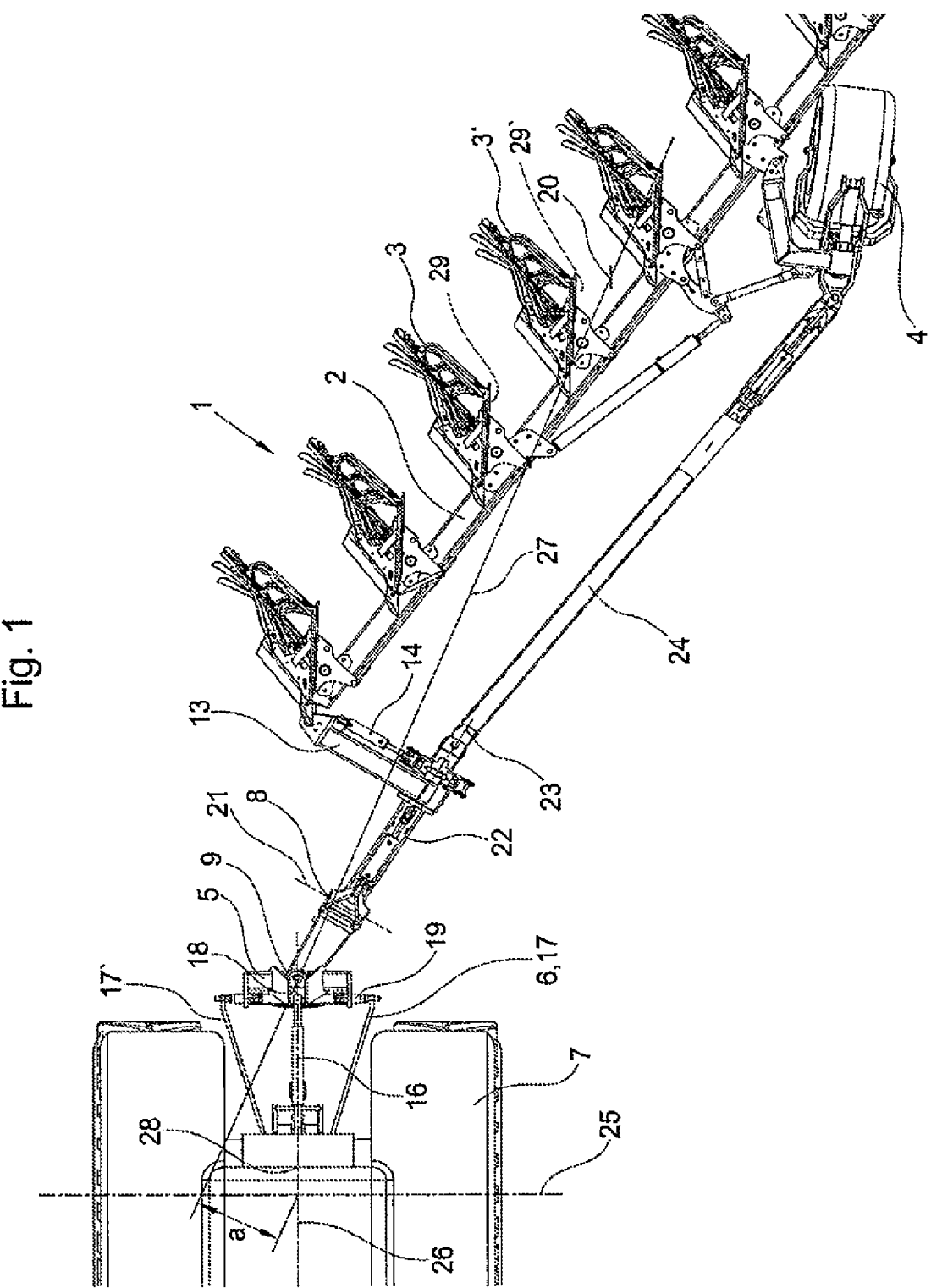
FIG. 1 shows a conventional semi-mounted plough in a top view.

FIG. 1 shows a combination consisting of a tractor 7 and a semi-mounted plough 1 attached thereto. The semi-mounted plough 1 is supported on the ground surface in its rear area by means of a hydraulic height-adjustable chassis 4 and is supported in its front area by means of the likewise hydraulic height-adjustable pulling device 6 of the tractor 7.

The pulling device 6 is designed as a three-point hydraulic system, consisting of two lower links 17, 17' and an upper link 16. The lower links 17, 17' can be lifted vertically, however, are fastened in a laterally fixed manner by stabilizer rods and points of articulation on the body of the tractor 7. The towing hitch 5 of the semi-mounted plough 1 has a rail shaft 19 in the lower area, which extends transversely to the central plane 26 of the tractor 7 or the towing hitch 5 and the towing hitch 5 is connected with the rear ends of the lower links 17, 17' via ball joints or arrester hooks or other suitable coupling devices. The upper link 16 is connected as a pendulum support with its front flexibly to the tractor 7 and at the rear end with the upper coupling point 18 of the towing hitch 5. The articulation axis 9 in the center of the towing hitch 5 forms a pivot bearing for the drawbar 8, which can pivot freely underneath the towing hitch from right to left up to the respective tire contour of the tractor 7. Thus, the semi-mounted plough 1 as a single axle trailer runs behind the tractor 7 and can be maneuvered accordingly. The drawbar 8 is interrupted by a transverse axis 21 and continues vertically pivotable in the support frame 22, in order to compensate for the unevenness of the ground between the tractor 7 and the semi-mounted plough. The plough frame 2 is connected pivotably about the turning axis 23 of the support frame 22 with the turning device 13 from a right into a left working position and vice versa. Hydraulic cylinders 14, which are activated via a control valve of the tractor 7, perform the pivoting movement of the turning device 13. In a central position, in which the turning device 13 is upright, the plough frame 2 with its plough bodies 3, 3' is above the supporting chassis 4. In this position the turning device is blocked and the transport position of the semi-mounted plough 1 for the road travel is achieved. Via further points of articulation the stabilizer 24 connects the rear supporting chassis 4 with the front support frame 22, the drawbar 8, and towing hitch 5 and thus the pulling device 6 of the tractor 7. Through the gimbal mounting the supporting chassis 4 maintains the same upright orientation as the tractor 7. Paired plough bodies 3, 3' are attached fixedly or pivotably via an upright axis to the plough frame 2. The upright pivotability of the plough body pairs together with a control rod, which connects the plough bodies with each other, is used for the cutting width adjustment of the plough bodies 3, 3' and thus for the working width setting of the entire plough. In each case, a plough body of a body pair is engaged in the right- or left-turning position of the plough frame 2 with the ground. The ground forces acting in each case on the plough bodies 3, 3' form a virtual traction point 20 of the entire semi-mounted plough 1. The lateral abutting pieces 29, 29' on the plough body support its lateral forces against the cut furrow edge in a sliding manner. If, for example, the plough is equipped with pairs of plough bodies 3, the virtual traction point 20 is approximately between the second and the fifth body pair. The traction force applied from the tractor 7 for pulling the semi-mounted plough 1 acts in a traction force vector 27 between virtual traction point 20 and articulation axis 9. Ideally this traction force vector 27 runs through the center point 28 of the rear axle 25 of the tractor 7, which intersects the vertical central plane 26 of the tractor 7. However, the traction force vector 27 actually forms a distance a to the rear axle center 28. Thus, a yaw moment arises, which due to the traction force acts on the tractor 7. The tractor driver must accordingly steer in the opposite direction. The force resulting from this yaw moment, which must be compensated by steering the tractor in the opposite direction, is called lateral pulling. Depending on the cutting width or number and distance of the plough bodies 3, 3' the traction force 27 varies in position and intensity and changes the lateral pulling.

Figure 2:
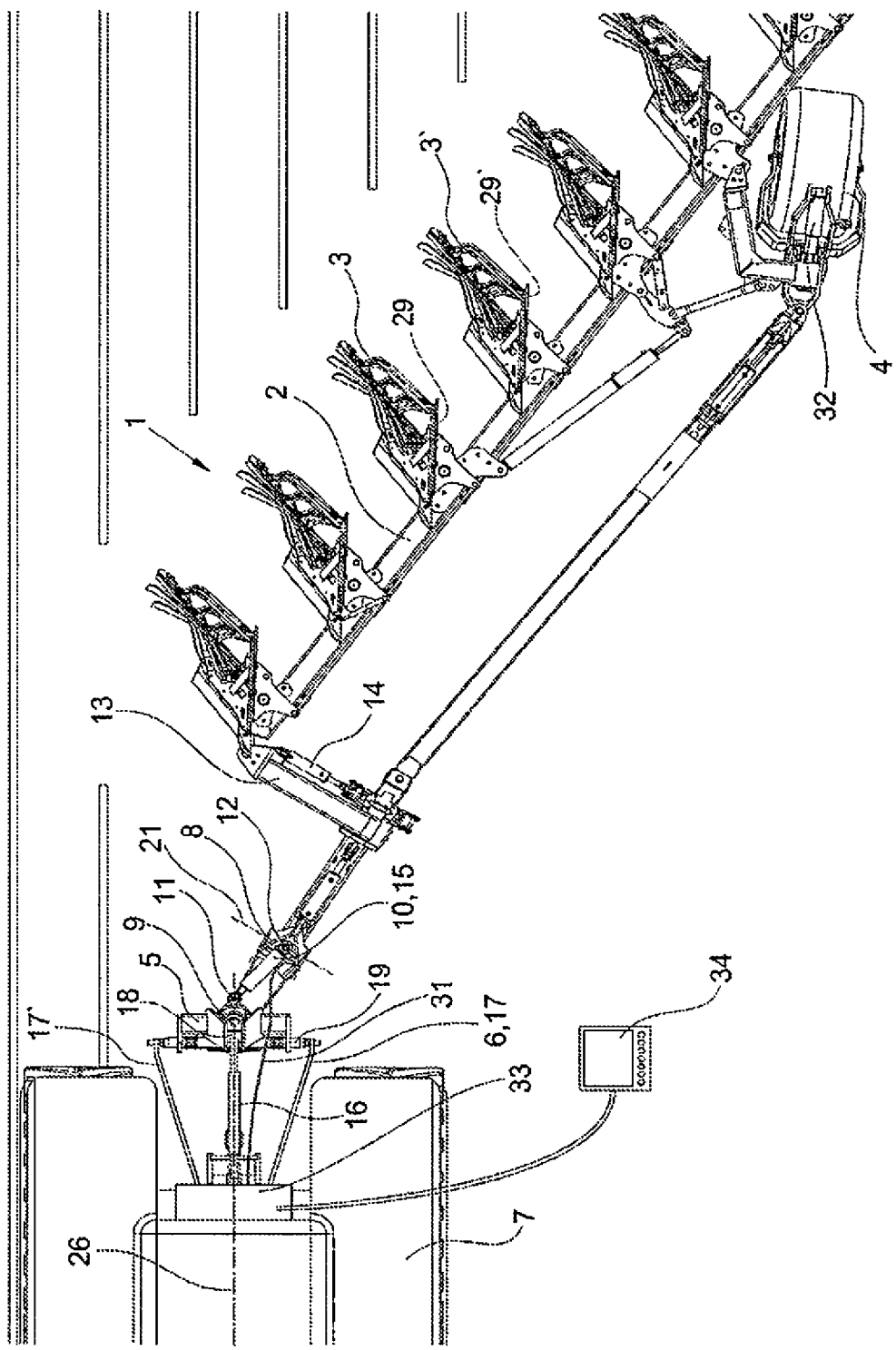
FIG. 2 shows a semi-mounted plough according to the present invention in a top view.

FIG. 2 describes the same arrangement of the tractor 7 and the semi-mounted plough 1, as previously described. However, a point of articulation 12 is arranged in a fixed manner to the drawbar 8 at the rear end of the drawbar 8 approximately at the level of the transverse axis 21. A further point of articulation 11 is arranged in a fixed manner to the towing hitch 5 at a distance to the articulation axis 9. This point of articulation 11 also intersects the central plane 26 of the tractor, in which the articulation axis 9 is also located due to the laterally rigid arrangement of the lower links 17, 17'. The energy accumulator 10 is fastened between the two points of articulation 11, 12. The energy accumulator 10 is designed as a fluid piston cylinder 15 or hydraulic cylinder, which is connected with a nitrogen pressure accumulator and delivers a compressive force to the two points of articulation 11, 12. Due to the inclined position of the drawbar 8 towards the direction of travel of the tractor 7 or its central plane 26 the compressive force of the energy accumulator generates a torque about the articulation axis 9, which counteracts the yaw moment previously described in FIG. 1 and in the case of the skillful design of the energy accumulator 10 eliminates the lateral pulling caused by the operation of the plough. The plough frame with its plough bodies 3, 3' is thereby supported via the abutting pieces 29, 29' against the furrow edge, such that the torque can be transferred in a directed manner in the manner of an articulated link to the tractor 7. The minimum and maximum installed length of the energy accumulator 10 is thereby suitably adapted to the respective position of the points of articulation 11, 12, which results from the steering movements of the drawbar 8 with respect to the towing hitch 5 or the steering angle of the entire train consisting of tractor 7 and semi-mounted plough 1. Through a skillful interconnection of the lifting hydraulics activation of the supporting chassis 4 with its lifting cylinder 32 as well as the energy accumulator 10 designed as a fluid piston cylinder 15 both functions can be activated in each case alternatingly by the valve block 33 of the tractor, since the energy accumulator 10 is only supposed to act in the lowered working position of the plough 1 and of the supporting chassis 4, however, not in the lifted transport- or turning position. The fluid piston cylinder 15 is connected with a first connection (A-side) of a double-acting valve block 33 via the pressure line 31, the rear lifting cylinder 32 via a line not shown with the second connection (B-side) of the same valve block or control valve. Another control both on the tractor side as well as by means of a central power-beyond-pressure supply and valve block 33 on sides of the semi-mounted plough is also conceivable. The valve block can be activated manually or, as shown, via a control- and regulating unit 34. This can be assigned to the tractor 7 as well as to the plough 1. In the case depicted, the control- and regulating unit 34 is combined with the operating- and display unit and is arranged in reach of the tractor driver. The control- and regulating unit 34 communicates via a data bus system with external actuators and sensors of the rotary plough 1 or tractor 7 as well as further display and control computers of the tractor. Reference is also made to the other figure descriptions with respect to the further reference signs.

Figure 3:
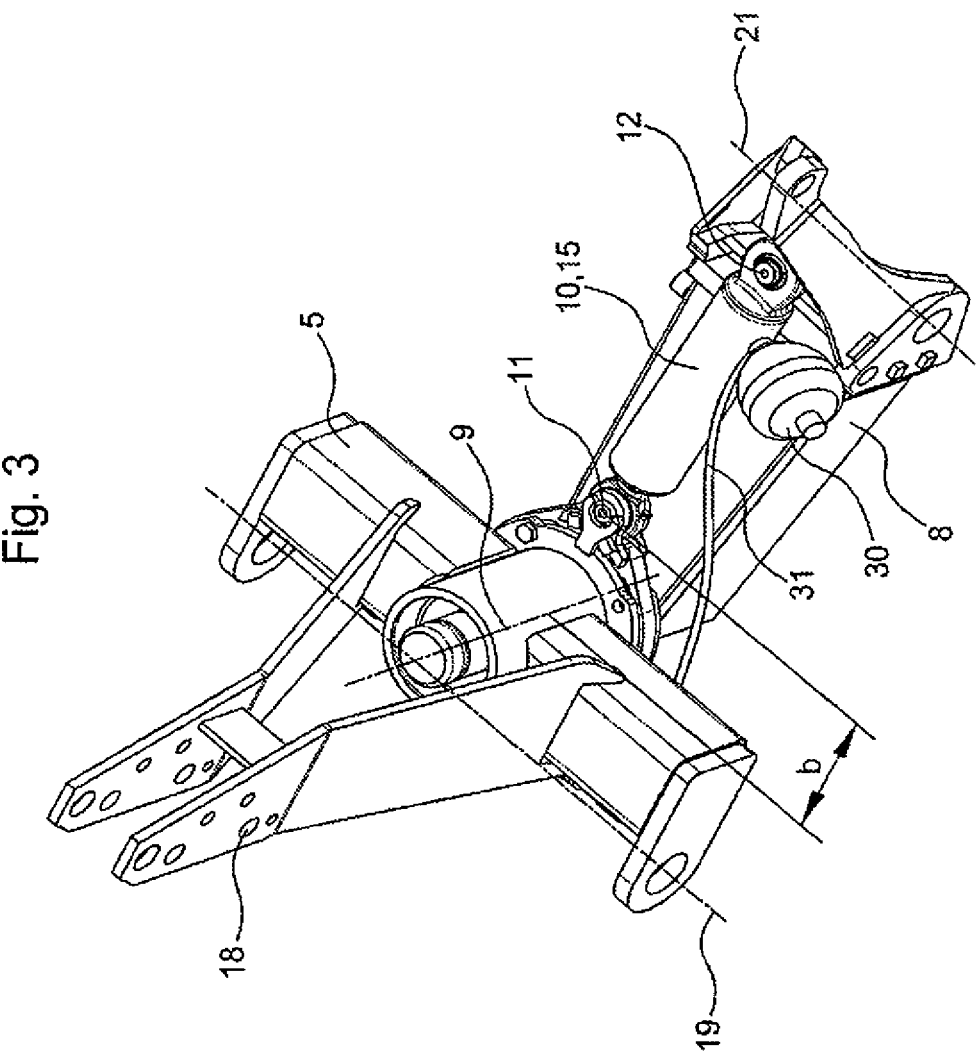
FIG. 3 shows a perspective detailed view of the energy accumulator arrangement in an approximately central drawbar location and FIG. 4 shows a detailed view of the energy accumulator arrangement according to FIG. 2.

FIG. 3 shows in detail the arrangement of the energy accumulator 10 or its points of articulation 11 and 12 between the drawbar 8 and the towing hitch 5, which can be moved laterally relative to one another about the articulation axis 9 depending on the position of the plough relative to the tractor. The upper link of the three-point hydraulic system of the tractor is set out with a bolt on the upper coupling point 18. In the lower area of the towing hitch 5 the recesses can be seen, through which the rail shaft 19, indicated here only as axis, is pushed and laterally fixed. The further support frame as an extension of the drawbar 8 is attached to the indicated transverse axis 21. The transverse axis 21 makes possible a vertical movability between plough and tractor, thus the plough can follow the tractor in hilly terrain. With a further energy accumulator a further torque can also be generated about the transverse axis 21 for the loading or unloading of the tractor front axle, in order to shift weight from the plough to the tractor. The front point of articulation 11 for receiving the energy accumulator is arranged at a distance b behind the articulation axis 9. As soon as the drawbar 8 and thus the rear articulation point 12 and the energy accumulator 10 pivot out laterally to the right or to the left, in each case a torque about the articulation axis 9 can be generated between drawbar 8 and towing hitch 5 by the compressive force of the energy accumulator and the projection of the lever distance b. The actual effective lever distance for the generation of torque corresponds thereby to the shortest distance of the longitudinal axis of the energy accumulator 10, which runs through the points of articulation 11 and 12, to the articulation axis 9. The tractor runs with a wheel in the furrow, which was drawn by the last plough body and tends in its movement to the already ploughed or turned over land as a result of the lateral pulling by the plough. If the drawbar 8 swings in the rear area to the right (left-turning plough position), a clockwise torque is generated, if the drawbar pivots to the left, a corresponding counterclockwise torque is generated about the articulation axis 9. Thus, through the applied torque the lateral pulling is reduced or eliminated depending on the compressive force of the energy accumulator. The energy accumulator 10 designed as a fluid piston cylinder 15 is connected with a nitrogen pressure accumulator 30 as well as the pressure supply of the towing tractor via a pressure line 31. Depending on the memory characteristic of the pressure accumulator, geometry of the fluid piston cylinder 15 as well as the hydraulic pressure set over the line 31, the spring characteristic or spring force of the energy accumulator and thus the torque counteracting the lateral pulling about the articulation axis 9 can be influenced. The pressure accumulator, which is connected in parallel to the fluid piston cylinder 15, makes possible an evasion of the fluid displaced by the fluid piston cylinder 15, for example, in a steering movement and ensures the elasticity of the energy accumulator. A control- and regulating unit, which is arranged on the tractor or the semi-mounted plough, activates shut-off valves, which are arranged on the tractor or the plough. A wide variety of control parameters can thereby be considered such as cylinder- or accumulator pressure, position of the towing hitch 5 with respect to the drawbar, traction- or body forces. A position-dependent switching or regulation can also be undertaken, for example, as part of a headland automation or for cornering in the terrain. The target- or actual position of the combination consisting of tractor and plough can thereby be pre-calculated geo-based by means of the control- and regulating unit, if corresponding coordinate data are available.

Figure 4:
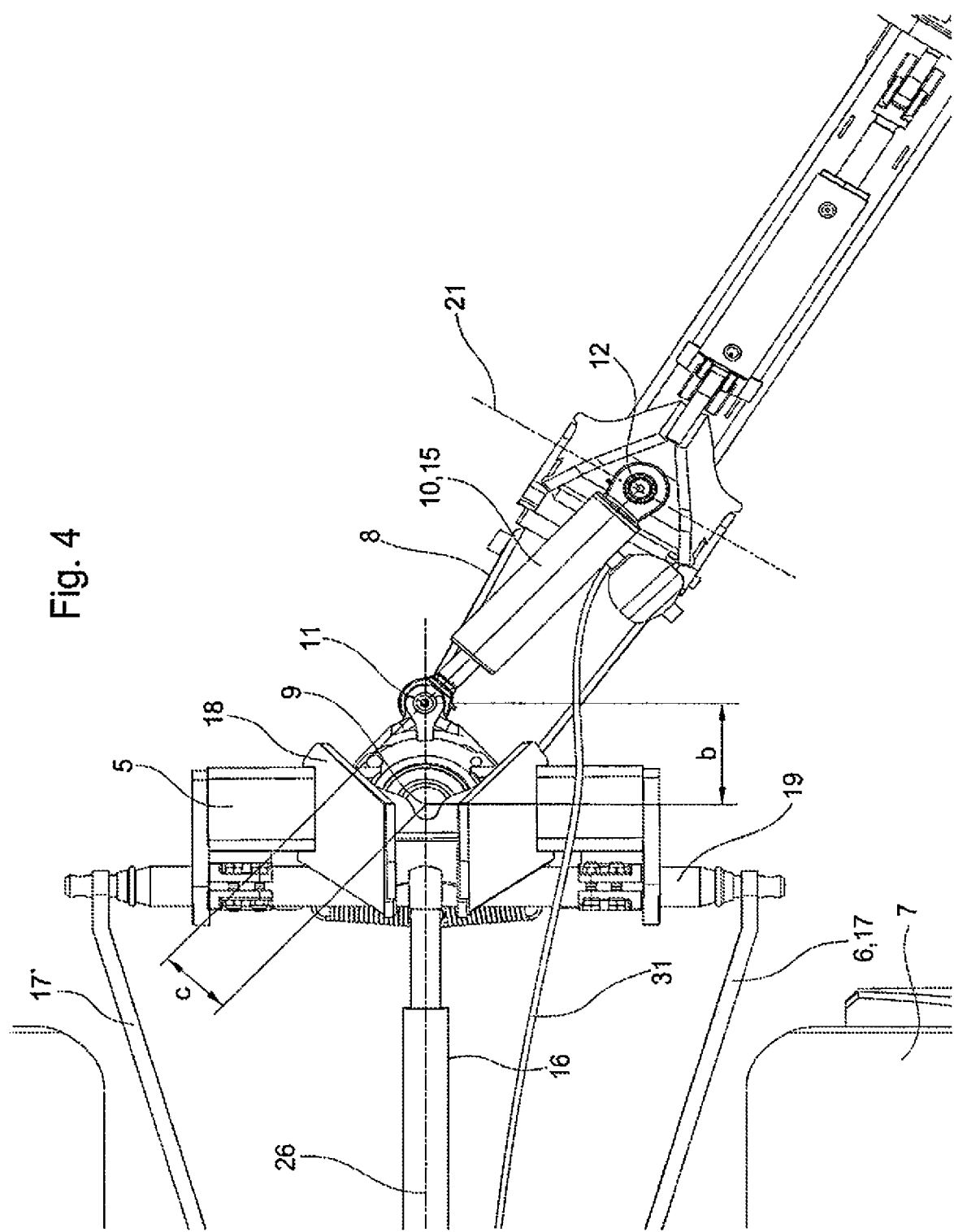

In addition, FIG. 4 analogously to FIG. 2 and its aforementioned description shows the position of the drawbar 8 pivoted laterally about the articulation axis 9 relative to the towing hitch 5. The point of articulation 11 remains fixed to the towing hitch 5 in the center behind it at a distance b to the articulation axis 9. On the other hand, point of articulation 12 pivots together with the drawbar 8 or the plough frame about the articulation axis 9 in the right-turning or opposite left-turning working position shown of the semi-mounted plough depending on the direction of travel of the combination consisting of the tractor and plough. With increasing pivot angle the effective lever distance c is formed. This is calculated from the spatial distance of the axis 9 to the imaginary axis between point of articulation 11 and 12, which defines the longitudinal axis and the force direction of the energy accumulator 10. With this effective lever distance c the energy accumulator with its spring force generates a steering torque about the articulation axis 9 on the tractor, which counteracts the lateral pulling described above. In the central turning- or transport position of the drawbar 8 the points of articulation 11, 12 and the articulation axis 9 are located on a line, as is nearly visible in FIG. 3. Thus, the effective lever distance c goes to zero and no steering torque acts on the towing hitch 5 or the tractor. A traction- or pressure spring arrangement placed in the front area of the towing hitch 5 fixes the towing hitch 5 in the central position relative to the drawbar 8, if the semi-mounted plough is turned off separately from the tractor and the energy accumulator 10 is deactivated. Thus, the mounting of the semi-mounted plough on the tractor is facilitated.

LIST OF REFERENCE SIGNS

| | |
|---|---|
| 1 | Semi-mounted plough |
| 2 | Plough frame |
| 3 | Plough body |
| 4 | Supporting chassis |
| 5 | Towing hitch |
| 6 | Pulling device |
| 7 | Tractor |
| 8 | Drawbar |
| 9 | Articulation axis |
| 10 | Energy accumulator |
| 11 | Point of articulation |
| 12 | Point of articulation |
| 13 | Turning device |
| 14 | Turning cylinder |
| 15 | Fluid piston cylinder |
| 16 | Upper link |
| 17 | Lower link |
| 18 | Coupling point |
| 19 | Rail shaft |
| 20 | Virtual traction point |
| 21 | Transverse axis |
| 22 | Support frame |
| 23 | Turning axis |
| 24 | Stabilizer |
| 25 | Rear axle |
| 26 | Central plane |
| 27 | Traction force vector, effective direction of the traction force |
| 28 | Rear axle center |
| 29 | Abutting piece |
| 30 | Pressure accumulator |
| 31 | Line |
| 32 | Lifting cylinder |
| 33 | Valve block, control valve, pressure supply |
| 34 | Control and regulating unit |

The invention claimed is:

1. A semi-mounted plough, comprising:
   a plough frame of the semi-mounted plough;
   at least one of a right and left-turning plough body, of the semi-mounted plough, attached to the plough frame;
   a supporting chassis, of the semi-mounted plough, for supporting at least a portion of a weight of the plough on a ground;
   a towing hitch, of semi-mounted plough, for coupling the plough to a pulling device of a tractor;
   a drawbar, of the semi-mounted plough, that connects the plough frame with the towing hitch in at least one of a laterally steerable and pivotable manner by at least one vertical articulation axis;
   a first point of articulation, of the semi-mounted plough, which is arranged fixedly to the towing hitch and spaced apart from the at least one vertical articulation axis;
   a second point of articulation, of the semi-mounted plough, which is arranged fixedly to at least one of the drawbar and the plough frame; and
   an energy accumulator, of the semi-mounted plough, which is attached between the first and second points of articulation, such that at least one of a compressive force and a spring force of the energy accumulator produces a torque about the at least one vertical articulation axis, with the at least one of the compressive force and the spring force counteracting a lateral pulling for the tractor.

2. A semi-mounted plough according to claim 1, wherein the energy accumulator is an adjustable spring accumulator.

3. A semi-mounted plough according to claim 1, further comprising a fluid piston cylinder provided as the energy accumulator, the fluid piston cylinder being hydraulically connected with an adjustable pressure source and at least one pressure accumulator element.

4. A semi-mounted plough according to claim 1, wherein at least one of the first and second points of articulation is variable and movable at a distance to the articulation axis.

5. A semi-mounted plough according to claim 1, further comprising a turning device for pivoting of the plough frame into at least one of a right and left working position, wherein the first point of articulation of the towing hitch is located in at least one of in front of the at least one vertical articulation axis and behind the at least one vertical articulation axis, as well as in a plane, the plane being stretched in a direction of travel of the tractor and passing through the at least one vertical articulation axis.

6. A semi-mounted plough according to claim 1, further comprising a switching-off device which at least one of activates the energy accumulator in a working position of the semi-mounted plough and deactivates the energy accumulator in at least one of a transport position of the semi-mounted plough and a turning position of the semi-mounted plough.

7. A semi-mounted plough according to claim 1, wherein the supporting chassis coupled to a hydraulic lifting device which is further coupled to a double-acting hydraulic control valve of the tractor, the double-acting hydraulic control valve alternately subjecting the energy accumulator and the hydraulic lifting device to pressure.

8. A semi-mounted plough according to claim 1, further comprising a control and regulating unit which at least one of adjusts and manipulates the force delivered from the energy accumulator to the first and second points of articulation.

9. A semi-mounted plough according to claim 8, further comprising a measurer which determines a position of at least one of the plough frame and the drawbar, the position with respect to one of the towing hitch and the forces between the plough frame and the towing hitch, wherein the measurer is connected with the control and regulating unit which acts in at least one of a controlling and regulating manner, on the energy accumulator based on the determined position.

10. A system comprising a tractor and a semi-mounted plough according claim 1.

11. The semi-mounted plough according to claim 8, further comprising a measurer which determines the working position of at least one of the plough frame and the drawbar, the working position with respect to at least one of the towing hitch and the forces between the plough frame and the tractor, wherein the measurer is connected with the control and regulating unit which acts in at least one of a controlling and regulating manner on the energy accumulator based on the determined working position.

12. The semi-mounted plough according to claim 8, further comprising a measurer provided on the tractor for determining at least one of energy and fuel consumption of the tractor which is introduced into a regulating circuit of the control and regulating unit and used for at least one of controlling and regulating the energy accumulator.

\* \* \* \* \*